Aug. 24, 1948.  J. L. BIGGS  2,447,930
HIGH SPEED OIL SEAL
Filed Feb. 15, 1947

INVENTOR
JOHN L. BIGGS
BY
ATTORNEYS

Patented Aug. 24, 1948

2,447,930

UNITED STATES PATENT OFFICE 2,447,930

HIGH-SPEED OIL SEAL

John Leo Biggs, Chicago, Ill., assignor to Gits Bros. Mfg. Co., Chicago, Ill., a corporation of Illinois Application February 15, 1947, Serial No. 728,915

4 Claims. (Cl. 286—11)

This invention relates to oil seals and the like, and particularly to seals of the cartridge type having an axially facing bearing surface for sealing engagement with a shoulder carried by a rotating member.

The main objects of this invention are to provide an improved seal for rotating members; to provide an improved seal of the cartridge type for sealing members rotating at relatively high speeds; to provide such a seal having an improved outer end closure for retaining lubricant within the moving parts of the seal and preventing the entrance of dust, dirt, or other foreign material to these said parts; to provide an improved cartridge type seal having a floating carrier for an axially facing sealing member; to provide such a seal in which the floating carrier is provided with an improved suspension to maintain the bearing face of the sealing member in a plane perpendicular to the axis of the rotating member being sealed; and to provide such a seal having improved means for urging the sealing member axially into angularly uniform engagement with a shoulder carried by the rotating member.

A specific embodiment of this invention is shown in the accompanying drawings in which.

Figures 1, 2, 3:
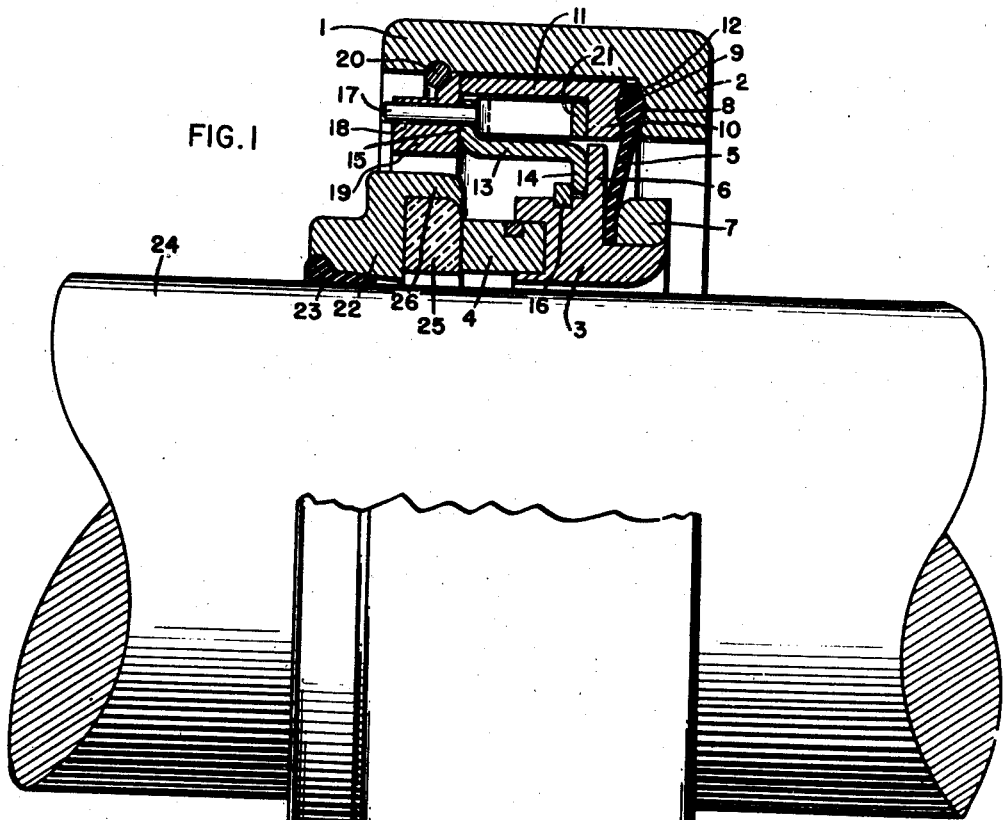
Figure 1 is a view in elevation and partly in section of the improved seal, all parts of which are substantially annular.
Fig. 2 is a plan view of the wobble spring employed in the seal of Fig. 1 to exert axial equalising pressure on the sealing member.
Fig. 3 is an edgewise development of the spring of Fig. 2 to show its sinuous shape.

In the form shown in the drawings, the improved seal is in the form of a cartridge which is slipped over the rotating member and held by a suitable support, not shown, the cartridge being stationary and having sealing means arranged to act axially to engage a collar or shoulder affixed to and rotating with the rotating member.

Such seals are generally well known in the art; however the present construction is particularly designed for sealing high speed rotating members and overcoming the pumping action that arises in ordinary cartridge type seals when they are used on members rotating at speeds such that seal contacting surface speed is well over 1,000 feet per minute.

As shown, the improved seal or seal cartridge comprises an annular shell or body 1 having an inwardly projecting radial flange 2 at its outer end and this shell houses a carrier 3 disposed concentrically within the shell and provided on its inner or forward face with an axially facing sealing member or element 4 which is arranged to bear in an axial direction.

The carrier 3 is supported adjacent its outer end by means of a diaphragm 5, made of any suitable flexible material such as thin metal or a fabric impregnated with oil-resistant synthetic rubber, which diaphragm is clamped against the outer shoulder of a flange-like portion 6, projecting radially from the body of the carrier 3, by means of a clamp ring or collar 7 which fits telescopingly over the outer end of the carrier 3 and is secured by spinning or otherwise forming the end of the carrier 3 in a radially outward direction.

The outer periphery of the diaphragm 5 is provided with a bead 8 which rests in a suitable annular groove or concavity 9 provided on the inner face or shoulder of the body flange 2 and is clamped against the flange 2 by means of the inwardly flanged end 10 of a cylindrical spacer or spreader ring 11 which nests within and extends in an axial direction along the inner wall surface of the body or shell 1. The outer shoulder of the flange 10 of the spreader ring is also provided with an annular groove or concavity 12, which is in registry with the groove 9, whereby the bead 8 of the diaphragm is gripped and securely held.

Preferably, the bead 8 on the diaphragm is initially formed with a circular section and the concavities 9 and 12 in the flanges 2 and 10, respectively, are of elliptical section. Thus, the bead 8, when clamped between the flanges, is caused to flatten somewhat and assume an elliptical shape which tightly fills the grooved portions of the flanges and provides a secure seal against the flow of any lubricant through or beyond the clamping area.

The carrier member 3 is also supported within the shell or body 1 by means of a hanger ring 13 which surrounds the carrier and extends generally in an axial direction within the spacer or spreader ring 11. The hanger ring is provided with an inwardly turned radial flange 14, at its rearward end, which engages the carrier and an outwardly turned radial flange 15 at its forward end, which extends toward the inner wall of the spacer ring 11. The flange 14 abuts the inner face of the flange 6 on the carrier 3 and is clamped to the carrier by means of a flat sided snap spring 16 which engages in a suitable annular groove formed in the side wall of the carrier. The forward flange 15 is provided with a plurality of angularly spaced axially extending pins 17 which slidably fit into suitably formed and spaced apertures 18 in a retainer ring 19 which is nested within the body 1 and which engages the forward end of the spacer ring 11. Finally the retainer ring 19 is locked in place within the shell or body 1 by means of a snap ring 20 which engages in a suitable groove formed on the inner surface of the shell. The leader or torque pins 17 serve to key the flange 15 and the retainer 19 and prevent rotation of the parts within the seal body thus eliminating torsional strain on the diaphragm 5.

When the seal is thus assembled, the carrier member 3 is supported within the body or shell 1 so as to have a limited floating movement in the axial direction, the diaphragm 5 flexing and the leader pins 17 sliding axially in the apertures 18 formed in the retainer ring 19, and in order to provide pressure or tension forwardly in the axial direction for sealing purposes an annular wobble spring 21 is disposed in the space between the flange 10 of the spacer ring and the forward flange 15 of the hanger ring. This wobble spring 21 is nested within the spacer ring 11 before the hanger ring 13 is installed and is normally compressed between the two flanges 10 and 15, when the retainer ring 19 is secured in the shell, so as to exert a forwardly directed axial pressure on the flange 15.

In the form shown, the wobble spring 21 is an annular member of wavy contour as indicated in Figures 2 and 3, made of spring metal and so formed that edgewise it has a sinuous appearance, providing resiliency against flattening in the axial direction. Thus, when compressed between the flanges 15 and 10 the wobble spring 21 will exert a substantially uniform pressure against the flange 15 of the hanger 13 and urge the carrier 3 forwardly in an axial direction and in a plane that is always perpendicular to the axis of the shaft or rotating member being sealed.

The sealing cartridge structure, which has been thus far described, is normally held stationary in the housing and the sealing action of the seal member 4 takes place in a plane normal to the axis of the rotating member and against a collar or shoulder which rotates with the member.

In order to overcome the difficulty of providing a perfectly lapped axially facing surface on a collar that is integral with the shaft, the present invention contemplates the use of a separate sealing collar which is affixed to the rotating member at the time the sealing cartridge is installed and which may be renewed when necessary. As shown the collar comprises a ring 22 which is affixed to the rotating member by being wedged over an annular washer or band 23, made of synthetic rubber or any other suitable yieldable or compressible material, which engages the surface of the rotating member. As shown, the washer or band 23 is tapered rearwardly and the inner periphery of the collar 22 is likewise tapered or converged rearwardly, so that when the collar 22 is driven over the washer or band 23 the parts become securely wedged to the rotating member 24. The collar 22 is thus secured to the rotating member against both axial and relative rotational movement so that the collar will turn with the rotating member without slipping.

As shown, the collar 22 is arranged to carry a sealing member 25 which is nested and secured within an axially extending peripheral flange 26 on the cartridge facing side of the collar 22. Thus the collar 22 may be of any suitable material or metal that can be easily formed and the sealing member 25 may be of any desired frictionless material or a material providing desired wearing qualities different from that of the collar material. The sealing ring 25 is held in the collar by spinning or otherwise forming the margin of the flange 26 inwardly so as to lock the sealing member in place.

It will be understood that the sealing members 4 and 25 may be any suitable combination of materials. For example, the stationary sealing member 4 may be a composition material or a carbon ring and the rotating sealing member 25 may be of hard polished material such as glass.

In the assembly of the improved cartridge seal, the carrier 3 together with the stationary sealing ring 4 and the diaphragm 5 are pre-assembled and handled as a unit and the carrier assembly is inserted within the body 1 so that the bead 8 at the periphery of the diaphragm 5 engages in the groove 9 formed on the inner surface of the flange 2. The spacer ring 11 is then nested within the body or shell 1 so that its flange 10 will engage the bead 8 of the diaphragm. The wobble spring 21 is then nested within the spreader ring 11 and the carrier 13 is inserted so that its flange 15 bears axially against the wobble spring. The rearward flange 14 of the hanger 13 is then secured to the carrier 3 by means of the snap ring 16 and, finally, the retainer ring 19 is nested within the housing 1 and fitted over the leader pins 17 of the hanger. The assembled parts are then compressed toward the flange 2 of the body 1 so that the retainer ring bears on the end of the spacer ring to clamp the bead 8 of the diaphragm between the flange 10 of the spacer ring and the flange 2 of the body. The parts are then locked and held in such clamping position by means of the snap ring 20 which engages in a suitably formed and located groove on the inside of the cartridge body.

It will thus be seen that the improved cartridge seal is not only easily assembled but also can be readily disassembled for renewal or exchange of parts. This last feature is of material advantage since the contacting sealing elements can be readily renewed when worn by merely installing a new carrier assembly in the cartridge and replacing the sealing collar on the rotating member, thereby minimizing replacement costs.

When installed on a rotating member, the cartridge is so positioned relative to the rotating collar fixed to the rotating member that the stationary sealing element 4 will bear tightly against the rotating sealing member 25. In so doing the wobble spring 21 is somewhat compressed due to rearward movement of the hanger 13 as it is carried by the carrier 3. Thus the wobble spring will exert a constant pressure or tension on the forward flange portion 15 of the hanger, tending to urge the sealing member 4 against the sealing member 25. Due to the forward disposition of the flange 15 on the hanger 13, the pressure action of the wobble spring 21 is exerted in substantially the same plane as the plane of contact between the sealing members 4 and 25, and the spring pressure is so transmitted to the carrier 3 by the hanger that the force applied to the carrier is in the nature of a pulling force rather than a pushing force. This provides a more uniform distribution of the pressure exerted by the wobble spring since the pressure, applied at several angularly spaced points against the flange 15 is distributed through the hanger 13 so as to act substantially uniformly around the periphery of the carrier 3 and thus maintain the carrier 3 in a plane perpendicular to the axis of the rotating member or shaft 24 at all times. This uniform distribution of pressure on the carrier 3 obviates the pumping action that usually occurs when the sealing members are urged together by springs pushing in the axial direction, as in cartridge seal constructions heretofore employed.

The main advantages of this invention reside in the construction whereby the axial pressure exerted on the sealing elements is uniformly distributed angularly so as to maintain positive annular sealing contact at all times. Other advantages are found in the improved arrangement of diaphragm connection between the sealing element carrier and the cartridge body whereby dirt and other foreign matter is prevented from entering any of the working parts of the seal. A further advantage is to be found in the fact that the improved seal construction is susceptible of quick and easy disassembly for the renewal of worn or deteriorated parts thereby materially reducing maintenance or replacement cost. And still further advantages are to be found in the improved construction whereby pumping action of the sealing members is obviated in high speed applications.

Although but one specific embodiment of this invention is herein shown and described, it will be understood that details of the construction shown may be altered or omitted without departing from the spirit of this invention as defined by the following claims.

1. In a seal comprising a hollow ring-like body having a sealing element carrier housed therein, said carrier having an annular sealing element disposed to bear forwardly in an axial direction, a ring-like hanger surrounding said carrier and attached thereto, said hanger having a forwardly extending wall and a radial flange thereon projecting toward the wall of said body, an axially extending pin projecting forwardly from said flange, a retaining means projecting radially inward from said body on the forward side of said flange and having an aperture to slidably receive said pin, and means bearing axially on said flange and normally urging said hanger in a forward direction.

2. In a seal comprising a hollow ring-like body having a sealing element carrier housed therein, said carrier having an annular sealing element disposed to bear forwardly in an axial direction, a ring-like hanger surrounding said carrier and attached thereto, said hanger having a forwardly extending wall and a radial flange thereon projecting toward the wall of said body, an axially extending pin projecting forwardly from said flange, a retaining ring secured within said body on the forward side of said flange and having an aperture to slidably receive said pin, and means bearing axially on said flange and normally urging said hanger in a forward direction.

3. In a seal comprising a hollow ring-like body having a sealing element carrier concentrically housed therein, said carrier having an annular sealing element disposed to bear forwardly in an axial direction, a ring-like hanger surrounding said carrier and attached thereto, said hanger having a forwardly extending wall terminating in a radial flange projecting toward the wall of said body, a plurality of angularly spaced pins projecting axially forward from said flange, a retaining means projecting radially inward from said body on the forward side of said flange and having spaced apertures arranged to slidably receive said pins, and means bearing axially on said flange and normally urging said hanger in a forward direction.

4. In a seal comprising a hollow ring-like body having a sealing element carrier concentrically housed therein, said carrier having an annular sealing element disposed thereon to bear axially forward, a ring-like hanger surrounding said carrier and having one end detachably connected thereto, said hanger having a forwardly extending wall terminating in a radial flange projecting toward the wall of said body, a plurality of angularly spaced axially extending pins projecting forwardly from said flange, a retaining ring removably mounted within said body on the forward side of said flange and having spaced apertures arranged to slidably receive said pins, and spring means bearing axially on said flange and normally urging said hanger in a forward direction.

JOHN LEO BIGGS.

REFERENCES CITED

The following references are of record in the file of this patent:

UNITED STATES PATENTS

| Number | Name | Date |
| --- | --- | --- |
| 1,972,077 | Eberhard | Sept. 4, 1934 |
| 2,122,378 | McCormack | June 28, 1938 |
| 2,233,709 | Osborne | Mar. 4, 1941 |
| 2,347,118 | Matter | Apr. 18, 1944 |
| 2,377,452 | Reynolds | June 5, 1945 |